United States Patent [19]

Yankus et al.

[11] Patent Number: 5,322,727
[45] Date of Patent: Jun. 21, 1994

[54] PLASMA SPRAY MASKING TAPE

[75] Inventors: Edward V. Yankus, Hoosick Falls; Robert F. Hamilton, Eagle Bridge, both of N.Y.

[73] Assignee: AlliedSignal Inc., Morris Township, Morris County, N.J.

[21] Appl. No.: 964,167

[22] Filed: Oct. 21, 1992

[51] Int. Cl.$^5$ .................. B32B 25/20; B32B 25/10; B32B 7/12

[52] U.S. Cl. .................. 428/266; 428/246; 428/288; 428/290; 428/343; 428/353; 428/354; 428/355

[58] Field of Search ............ 428/246, 266, 354, 355, 428/353, 343, 288, 290

[56] References Cited

U.S. PATENT DOCUMENTS

| | | | |
|---|---|---|---|
| 4,246,313 | 1/1981 | Stengle, Jr. | 428/266 |
| 4,762,751 | 8/1988 | Girgis et al. | 428/266 X |
| 4,822,659 | 4/1989 | Anderson et al. | 428/266 X |
| 5,112,683 | 5/1992 | Johansen | 428/354 |

OTHER PUBLICATIONS

"Flame Spray Tapes From Fluorglas"–AlliedSignal Inc.

Primary Examiner—Daniel Zirker
Attorney, Agent, or Firm—Roger H. Criss; Melanie L. Brown

[57] ABSTRACT

A masking tape for use in masking a part in a high velocity oxy-fuel (HVOF) plasma spray process. The tape is formed from a fabric which is tightly woven from yarns of aramid fibers. A silicone rubber impregnates the inner fabric layer. First and second silicone rubber layers are coated onto opposite sides of the impregnated fabric. A pressure-sensitive adhesive is coated onto the second silicone rubber layer, which is preferably laminated with a release liner.

13 Claims, No Drawings

# PLASMA SPRAY MASKING TAPE

BACKGROUND OF THE INVENTION

1. Field of the Invention

This invention related to a flame spray tape to mask articles during a plasma spray process.

2. Description of the Prior Art

Plasma or flame spraying of parts is a known technique for applying a protective metal or ceramic coating to the part. Such process provides a thermal spray coating over the part by bringing the metal or ceramic to the melting point and spraying on a surface to produce a thin coating. Plasma spray coating typically is achieved using a plasma gun or similar device.

In the plasma spray process, it is important to mask certain areas of the parts in order to prevent application of the coating. Reasons for masking parts include preventing the coating from entering apertures in the part, maintaining dimensions within a critical range, weight savings and the like. To achieve such masking, a masking tape is applied over the areas in which the coating is not desired.

The masking tape must exhibit excellent thermal and abrasion - resistance, both in protecting adjacent surfaces from the grit blasting that is typically used as a surface preparation and the actual plasma spray coating. Such tape must not lift off or fray during this demanding process and are designed to quickly and easily release from the part surface without leaving an adhesive residue.

Conventional plasma spray tapes typically include a glass fabric which is impregnated with a silicone adhesive and which is coated with a high temperature silicone pressure sensitive adhesive. A release liner is usually employed for convenient handling. Other types of masking tapes include a thin aluminum foil laminated to a fiber glass cloth.

Although such masking tapes are effective with the typical plasma spray process, they are not effective with a recently introduced, more demanding process known as a high velocity oxy-fuel (HVOF) process. This process is a continuous combustion process in which the spray gun is essentially a rocket in which the powder is injected into the exhaust stream. The exhaust stream is exiting at hypersonic speed (several thousand feet per second).

It would be desirable to provide an improved plasma spray masking tape which will withstand the extremely demanding HVOF process.

SUMMARY OF THE INVENTION

In accordance with this invention, there is provided a masking tape for use in masking against a high velocity oxy-fuel plasma spray process, the masking tape comprising:

(a) an inner fabric layer formed of tightly woven yarns of aramid fibers;

(b) a silicone rubber impregnating the inner fabric layer;

(c) a first silicone rubber layer coated on a first face of the impregnated inner fabric layer;

(d) a second silicone rubber layer coated on a second face of the impregnated inner fabric layer; and (e) a silicone pressure-sensitive adhesive coated onto the second silicone rubber layer.

DESCRIPTION OF THE PREFERRED EMBODIMENTS

The masking tape of this invention is useful in a high velocity oxy-fuel (PEVOF) plasma spray process. The tape has an internal fabric layer which is tightly woven from aramid fibers. A preferred fabric layer is a woven aramid fabric available under the trademark Kevlar. Preferably, the yarns have a substantially flat cross-section, and the fabric is woven in a plain weave, although other weaves may be employed.

As mentioned above, the fabric employed in this invention is woven from aramid fiber yarns in a tightly woven pattern. This reduces the open spaces between the overlapping yarns. Preferably, the fabric has a thread count of from about 20×20 to about 30×30 (per inch). The fabric preferably is a relatively light weight fabric which has a weight of from about 1.5 to about 5 ounces/square yard. The thickness of the fabric may range, for example, from about 3 to about 10 mils.

The fabric layer is impregnated with a silicone rubber, which may be accomplished in any suitable manner. Preferably, the silicone rubber is applied by a dip coating and metering process and the fabric is dried in a drying oven. The silicone rubber employed is a liquid having a low viscosity and is typically formed by mixing and blending a two component system. The viscosity of the mixed material typically may be in the range of about 15,000 to about 35,000 cps. The silicone rubber preferably is a material which is a platinum-catalyzed addition reaction product. The fabric is impregnated with the silicone rubber such that the entire fabric is within a silicone rubber matrix. The silicone rubber may extend beyond the fabric's outer surfaces to any desired amount.

After the aramid fabric is impregnated with the silicone rubber, a layer of silicone rubber is coated onto one side of the impregnated aramid fabric. Preferably, the side that is coated first is the front side of the fabric, i.e., the side that faces the plasma spray in use. The silicone rubber employed as the coating layer preferably is the same type of silicone rubber that is used to impregnate the aramid fabric. The silicone rubbers employed in this invention are also referred to as silicone elastomers.

The coating of the silicone rubber layer onto the impregnated aramid fabric layer can be performed using any suitable technique. Preferably, the silicone rubber coating is applied by a horizontal knife over roll coater and the coated fabric is dried in a drying oven.

The thickness of the first coating layer (on the back side of the fabric) may range from about 5 to about 20 mils, preferably from about 12 to about 16 mils.

The impregnated aramid fabric is then coated on its opposite face, also with a silicone rubber. Again, any suitable coating technique can be employed. Preferably, the same type of coating apparatus that is used to coat the front side of the fabric is also used to coat the opposite side.

The thickness of the second coating layer is generally thinner than that of the first coating, and may range from about 3 to about 20 mils, preferably about 6 to about 10 mils.

It may be possible to apply both the first and second coatings at the same time to opposite sides of the fabric. In each coating step, an appropriate drying operation is employed.

A silicone pressure-sensitive adhesive layer is coated onto the exterior of the second silicone rubber layer. Any suitable silicone adhesive may be employed. Preferred is a high temperature di-phenyl silicone adhesive. The adhesive layer is preferably applied by a reverse roll coater and is dried in a drying oven. Typically, the thickness of the silicone adhesive layer is about 3 to about 10 mils, preferably about 4 to about 7 mils.

A release liner is preferably laminated to the silicone adhesive layer in a conventional manner. The release liner may be any liner that is typically used for silicone pressure-sensitive adhesives.

Preferably, a primer layer is coated onto the exterior face of the second silicone rubber coating before the adhesive layer is applied, in order to promote adhesion of the adhesive to the silicone rubber. The primer may be another silicone layer, which may be applied as a relatively thin layer (such as on order of less than about 0.5 mils).

As mentioned above, the masking tape of this invention finds suitability to mask PIVOF plasma sprayed parts. In such process, the tape must be able to withstand high impact at temperatures in the range of above about 500° F. (260° C.). It is believed that the aramid fabric layer provides increased strength, flexibility and abrasion resistance to the masking tape structure. The impregnated silicone adhesive is believed to also improve the abrasion resistance of the construction. In addition, the use of the silicone layer beneath the fabric is believed to provide impact resistance so as to cushion the impact of the spray particles, thereby allowing the fabric to absorb more energy from the spray.

The HVOF plasma spray tape of the present invention can be applied to mask an object for spraying in a simplified process. This is in contrast to the expensive and time-consuming previously employed system in which a metal tool is designed and made to mask the object to be coated. In addition, the masking tape of this invention can be used to make the coating of irregularly shaped objects possible.

What is claimed is:

1. A masking tape for use in masking against a high velocity oxy-fuel plasma spray process, said masking tape comprising:
   (a) an inner fabric layer formed of tightly woven yarns of aramid fibers, wherein said fabric layer has a thickness of from about 3 to about 10 mils and a weight of from about 1.5 to about 5 ounces/square yard;
   (b) silicone rubber impregnating said inner fabric layer, the resultant impregnated layer having a first face and a second face;
   (c) a first silicone rubber layer which has a thickness of from about 5 to about 20 mils coated on the first face of said impregnated inner fabric layer;
   (d) a second silicone rubber layer which has a thickness of from about 3 to about 20 mils coated on the second face of said impregnated inner fabric layer; and
   (e) a silicone pressure-sensitive adhesive coated onto said second silicone rubber layer.

2. The masking tape of claim 1, further comprising a release liner laminated to said silicone pressure-sensitive adhesive.

3. The masking tape of claim 1, wherein said fabric layer is woven from substantially flat aramid yarns.

4. The masking tape of claim 3, wherein said woven fabric has a plain weave.

5. The masking tape of claim 1, further comprising a primer layer interposed between said second silicone rubber layer and said pressure-sensitive adhesive.

6. The masking tape of claim 1, wherein said first silicone rubber layer is thicker than said second silicone rubber layer.

7. The masking tape of claim 1, wherein said fabric layer has a thread count of from about 20×20 to about 30×30 per inch.

8. The masking tape of claim 1, wherein said silicone pressure-sensitive adhesive has a thickness of from about 3 to about 10 mils.

9. The masking tape of claim 1, wherein said fabric layer is impregnated such that the entire fabric layer is within a silicone rubber matrix.

10. A masking tape for use in masking against a high velocity oxy-fuel plasma spray process, said masking tape comprising:
    (a) an inner fabric layer formed of tightly woven substantially flat yarns of aramid fibers; said fabric layer having a thickness of from about 3 to about 10 mils, a weight of from about 1.5 to about 5 ounces/square yard and a thread count of from about 20×20 to about 30×30 per inch;
    (b) a silicone rubber impregnating said inner fabric layer, the resultant impregnated layer having a first face and a second face, with the entire fabric layer being within a silicone rubber matrix;
    (c) a first silicone rubber layer coated on the first face of said impregnated inner fabric layer, said first silicone rubber layer having a thickness of from about 5 to about 20 mils;
    (d) a second silicone rubber layer coated on the second face of said impregnated inner fabric layer, said second silicone layer having a thickness of from about 3 to about 20 mils; and
    (e) a silicone pressure-sensitive adhesive coated onto said second silicone rubber layer.

11. The masking tape of claim 10 wherein said pressure-sensitive adhesive has a thickness of from about 3 to about 10 mils.

12. The masking take of claim 11 further comprising a release liner laminated to said silicone pressure-sensitive adhesive.

13. The masking tape of claim 10, wherein said first silicone rubber layer is thicker than said second silicone rubber layer.

* * * * *